US007632054B2

(12) United States Patent
McGrane et al.

(10) Patent No.: US 7,632,054 B2
(45) Date of Patent: Dec. 15, 2009

(54) FORKLIFT LOADING SUPPORT

(75) Inventors: Barry McGrane, Clogherhead (IE); Kevin Turnbull, Dundalk (IE)

(73) Assignee: Moffett Research & Development Limited, Dundalk, County Louth (IE)

( * ) Notice: Subject to any disclaimer, the term of this patent is extended or adjusted under 35 U.S.C. 154(b) by 339 days.

(21) Appl. No.: 11/633,645

(22) Filed: Dec. 5, 2006

(65) Prior Publication Data

US 2007/0166141 A1 Jul. 19, 2007

(30) Foreign Application Priority Data

Dec. 5, 2005 (IE) .............................. S2005/0810

(51) Int. Cl.
*B60P 1/00* (2006.01)

(52) U.S. Cl. ........................ 414/475; 414/660; 414/661

(58) Field of Classification Search ................. 414/471, 414/475, 467, 659, 660, 661
See application file for complete search history.

(56) References Cited

U.S. PATENT DOCUMENTS 7,001,131 B2 * 2/2006 O'Keeffe .................... 414/467

FOREIGN PATENT DOCUMENTS

EP 1457456 A1 9/2004

* cited by examiner

*Primary Examiner*—Saúl J Rodriguez
*Assistant Examiner*—Joshua I Rudawitz
(74) *Attorney, Agent, or Firm*—Jacobson Holman PLLC

(57) ABSTRACT

This invention relates to a forklift truck (1) of the type adapted to be mounted on a carrying vehicle, commonly referred to as a piggy-back forklift. The forklift truck has a forklift loading support comprising an upright bar (19) is mounted on the mast carriage (9) between the upright mast (11) and the side bar (7). The upright bar (19) may be pivotally mounted on the mast carriage, pivotable to and from a platform engaging position forward of the mast and a stowed position rearward of the front surface of the mast. The forklift loading support may be deployed very quickly and will not hinder loading of the forklift onto a carrying vehicle or require modification of the mounting gear for the forklift truck.

40 Claims, 9 Drawing Sheets

FORKLIFT LOADING SUPPORT

INTRODUCTION

This invention relates to a forklift truck of the type adapted to be transported on a carrying vehicle, the forklift truck comprising a wheeled U-shaped chassis having a rear crossbar and a pair of side bars mounted at either end of the rear crossbar and projecting forwardly therefrom, a mast carriage slidably mounted on the chassis between the side bars movable towards and away from the rear crossbar, means to move the mast carriage towards and away from the rear crossbar, an upright mast carrying forks mounted on the mast carriage, means to extend the reach of the forks relative to the mast to remove and place loads on a raised platform, and a platform engaging load rest support comprising a substantially upright bar having a contact surface for engagement against a substantially vertical, external facing surface of the platform.

BACKGROUND OF THE INVENTION

Forklift trucks of the type adapted to be transported on a carrying vehicle, commonly referred to as piggy-back forklifts, are necessarily of light-weight construction. This is due to the fact that any increase in the weight of the forklift has the direct effect of reducing the carrying capacity of the carrying vehicle. Furthermore, any increase in weight of the piggy-back forklift puts additional strain on the fork tines and any other mounting equipment when the forklift is mounted on the carrying vehicle. Due to the light-weight nature of the forklifts, there is a tendency of the piggy-back forklifts to overbalance when attempting to maneuver heavy goods at or near maximum reach of the forklift. For example, when the forklift is used to load or unload heavy goods to the far side of an elevated platform, such as a trailer bed, at or near maximum reach there is a tendency for the piggy-back forklift to topple forwards against the platform until the mast of the piggy-back forklift abuts against the platform. This is highly undesirable as it may cause irreparable damage to the mast caused by the impact and furthermore can hinder the loading or unloading of goods by preventing either side shift or tilt operations of the mast which are normally needed for correct handling of the goods. In other constructions of forklift trucks, this problem would be overcome simply by adding more weight to the rear of the forklift, but this is simply not feasible for piggy-back forklift trucks.

Various mechanisms have been provided to facilitate the loading and unloading of goods on a raised platform by a piggy-back forklift at or near maximum reach, however, although many of these have certain benefits, generally speaking they do not allow the piggy-back forklift to be operated in the manner that was intended. One forklift loading support that overcomes many of the difficulties with the known types of forklift loading support is described in the Applicants' own published European Patent Application, EP 1 457 456, the entire disclosure of which and in particular the description concerning the loading and unloading of goods from the far side of a trailer is incorporated herein by way of reference. EP 1 457 456 describes a number of constructions of forklift loading support mounted on the side bar of the chassis that facilitate loading and unloading of goods from an elevated platform at or near maximum reach of the piggy-back forklift. There are however problems with the constructions of forklift loading support described therein.

First of all, one construction of loading support described in EP 1 457 456 requires modification of the mounting arrangement of the forklift on the carrying truck in certain instances which is undesirable. Secondly, where the load rest support is permanently mounted adjacent the front of the side bar, extra care and attention must be paid by the operator of the forklift truck when loading the forklift onto the rear of a carrying vehicle so that no damage is caused to the load rest supports. This slows down the process of loading and unloading a piggy-back forklift onto the carrying vehicle. Furthermore, the load rest supports are relatively exposed and can be scraped, or even distorted as a result of an impact caused during loading or unloading of the forklift on the carrying vehicle, which can damage the load rest supports and hinder their subsequent operation as well as hinder subsequent loading or unloading of the piggy-back forklift on the carrying vehicle.

The other main construction of load rest support described in EP 1 457 456 requires the use of locking pins for storing the rest support in an upright position when not in use. These are quite cumbersome and time-consuming for the operator of the piggy-back forklift to manipulate which further increases the time needed to load and unload the piggy-back forklift onto a carrying vehicle. Finally, for both constructions of load rest support shown, it can take a significant amount of time to manipulate the load rest support to and from an operating platform engaging position and a stowed position which is undesirable.

OBJECTS OF THE INVENTION

It is an object therefore of the present invention to provide a forklift loading support that overcomes at least some of the difficulties with the known forklift loading supports that is simple to use and efficient in operation.

SUMMARY OF THE INVENTION

The invention provides a forklift truck of the type adapted to be transported on a carrying vehicle, the forklift truck comprising a wheeled U-shaped chassis having a rear crossbar and a pair of side bars mounted at either end of the rear crossbar and projecting forwardly therefrom, a mast carriage slidably mounted on the chassis between the side bars movable towards and away from the rear crossbar, means to move the mast carriage towards and away from the rear crossbar, an upright mast carrying forks mounted on the mast carriage, means to extend the reach of the forks relative to the mast to remove and place loads on a raised platform, and a platform engaging load rest support comprising a substantially upright bar having a contact surface for engagement against a substantially vertical, external facing surface of the platform characterized in that the upright bar is mounted on the mast carriage.

By providing such an arrangement of load rest support, many of the difficulties associated with the known load rest supports that are mounted on the side bar of the chassis are overcome. The load rest support mounted on the mast carriage will not require any modification to the mounting arrangement on the carrying vehicle and the load rest support will not be prone to damage during loading or unloading of the forklift on a carrying vehicle. Furthermore, by having a load rest support mounted on the mast carriage, it is possible to have a more simplified construction of forklift that does not require the use of locking pins and the like that may be used in a simple and effective manner with the minimum of difficulty. The load rest support will be able to engage the platform to facilitate loading or unloading of goods to and from the elevated platform thereby allowing the mast of the piggy-back forklift to be operated as intended with side shift and/or tilt operation. Furthermore, a much simpler construction of forklift loading support that is easier and more cost effective to manufacture is provided.

In one embodiment of the invention there is provided a forklift truck in which the upright bar is fixed in position relative the mast carriage with the contact surface forward of the mast. In certain instances, it is envisaged that the upright bar may be fixed in position and will not require the use of actuating rams or the like to move the upright bar into position. This will significantly speed up and simplify the use of the forklift loading support. Furthermore, by having a such a construction of load rest support, it will be possible to provide a lighter construction of load rest support with less components than was heretofore the case which is a significant advantage for a piggyback forklift truck.

In another preferred embodiment of the invention there is provided a forklift truck in which the upright bar is pivotably mounted on the mast carriage and the contact surface is pivotable to and from a platform engaging position forward of the mast and a stowed position rearward of a leading surface of the mast. In this way, the forklift loading support will not inhibit the use of the mast and in particular the side shift capability of the mast. The forklift loading support may be stowed in a simple manner where it will not inhibit either operation of the mast or mounting of the forklift on the trailer.

Preferably, there is provided means to pivot the upright bar to and from a platform engaging position and a stowed position. Ideally this means may be provided by way of a ram, one end of which is pivotably mounted on the mast carriage and the other end of which is connected to the upright bar. Ideally, the ram is a double-acting ram.

In a further embodiment of the invention there is provided a forklift truck in which the upright bar, when pivoting to and from a platform engaging position and a stowed position, pivots through no more than a 45° angle. Preferably, the upright bar will pivot through no more than a 30° angle. This will ensure that the load rest support may be moved to and from a stowed configuration and an operable platform engaging position in a relatively short space of time with the minimum of difficulty. Furthermore, this will ensure that the load rest support does not require a significant amount of space for storage. Such a load rest support may be brought into use and stowed away far quicker than was heretofore possible.

In one embodiment of the invention there is provided a forklift truck in which the upright bar is cranked intermediate its ends. By having the upright bar cranked intermediate its ends, a pivot point chosen on the mast carriage for the upright bar may be positioned further back on the mast carriage thereby obviating the need to lengthen the mast carriage and increase the weight of the forklift.

In another embodiment of the invention there is provided a forklift truck in which the upright bar is mounted on the mast carriage intermediate the mast and the side bar.

In a further embodiment of the invention there is provided a forklift truck in which the upright bar is mounted on the mast carriage adjacent the forward-most part of the mast on the mast carriage. By mounting the upright bar adjacent the forward-most part of the mast on the mast carriage, the upright bar will have to be pivoted through the minimum distance in order to successfully position the upright bar in front of or rearwardly of the upright mast. This will significantly help to reduce the amount of time taken to appropriately position the load rest support for engagement of a platform, or to store the load rest support out of the way when it is not required. This speeds up the operation of the load rest support which facilitates loading and unloading of goods.

In one embodiment of the invention there is provided a forklift truck in which the upright bar is mounted on the mast carriage adjacent the side bar.

In another embodiment of the invention there is provided a forklift truck in which the contact surface of the upright bar is inclined forwardly when in a platform engaging position.

In a further embodiment of the invention there is provided a forklift truck in which the upright bar is provided with a releasably detachable face plate to act as the contact surface.

In one embodiment of the invention there is provided a forklift truck in which there are provided a pair of upright bars, one mounted on either side of the upright mast on the mast carriage.

In another embodiment of the invention there is provided a forklift truck in which the means to extend the reach of the forks relative to the mast comprise extendable forks. Alternatively, the means to extend the reach of the forks relative to the mast comprises a pantograph linkage carried by the mast which in turn mounts a fork carrier carrying the forks.

BRIEF DESCRIPTION OF THE DRAWINGS

The invention will now be more clearly understood from the following description of some embodiments thereof, given by way of example only, with reference to the accompanying drawings, in which:

FIG. 1(*b*) is an enlarged view of the circled portion in FIG. 1(*a*);

FIG. 2(*b*) is an enlarged view of the circled portion of FIG. 2(*a*);

FIG. 3(*b*) is an enlarged view of the circled portion of FIG. 3(*a*);

FIG. 4(*b*) is an enlarged view of the circled portion of FIG. 4(*a*)

DETAILED DESCRIPTION OF THE PREFERRED EMBODIMENTS

Figure 1A:
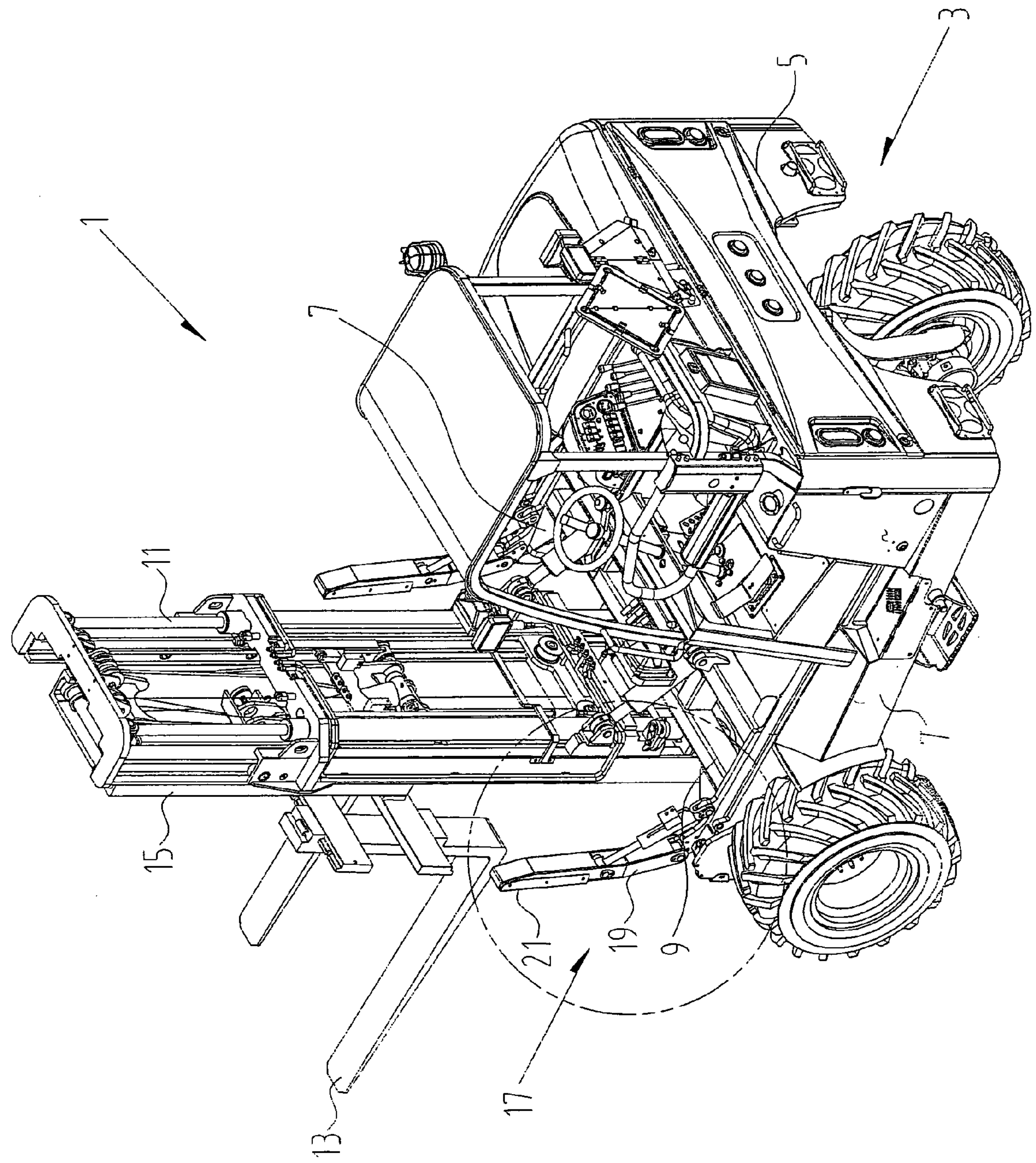
FIG. 1(*a*) is a rear perspective view of a piggy-back forklift truck having a platform engaging load rest support according to the invention.
Figure 1B:
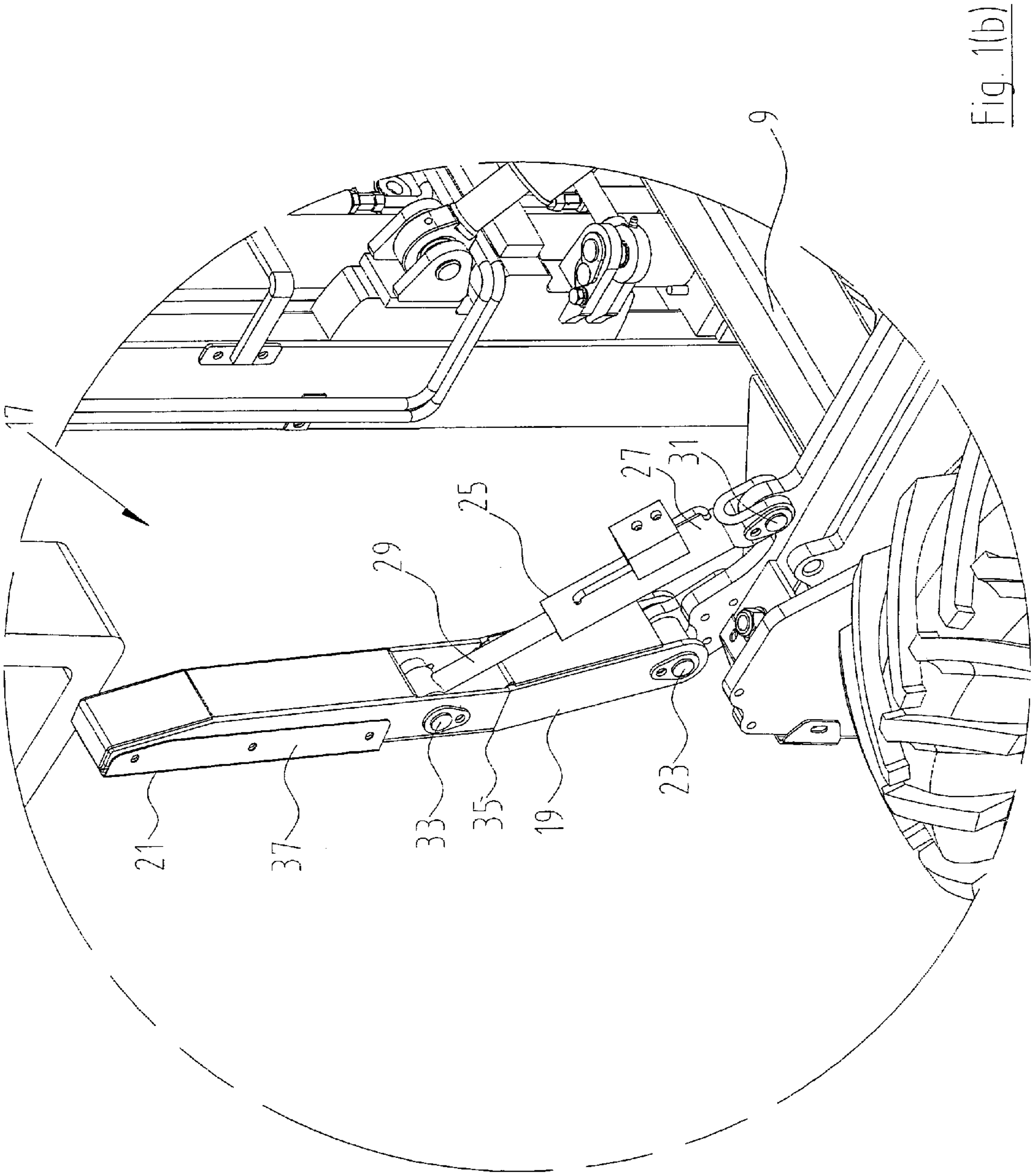

Referring to the drawings and initially to FIG. 1(*a*) thereof, there is shown a piggy-back forklift truck, indicated generally by the reference numeral 1, comprising a wheeled U-shaped chassis 3 having a rear crossbar 5 and a pair of side bars 7 mounted at either end of the rear crossbar and projecting forwardly therefrom. A mast carriage 9 is slidably mounted on the chassis 3 between the side bars 7 movable towards and away from the rear crossbar 5 and there is provided means (not shown) to move the mast carriage 9 towards and away from the rear crossbar 5. An upright mast 11 carrying forks 13 is mounted on the mast carriage and there is provided means to extend the reach of the forks relative to the mast to remove and place loads on a raised platform (not shown), in this case provided by way of pantograph linkage 15. A platform engaging load rest support 17 comprising a substantially upright bar

19 having a contact surface 21 for engagement against a substantially vertical, external facing surface of the platform is mounted on the mast carriage 9. There is provided a pair of upright bars 19 mounted on either side of the upright mast 11 on the mast carriage.

Referring now to FIG. 1(*b*) of the drawings, the load rest support 17 comprises an upright bar 19 pivotally mounted on the mast carriage 9 about the point 23. A double-acting ram 25, operable to pivot the upright bar 19 to and from a platform engaging position forward of the mast and a stowed position in which the contact surface 21 is rearward of the leading surface of the mast is provided. The ram in turn comprises a cylinder 27 and a piston 29. The cylinder 27 is pivotally mounted on the mast carriage 9 about pivot point 31 and the piston 29 is pivotally connected to the upright bar 19 intermediate its ends at pivot point 33. The upright bar 19 is cranked intermediate its ends at point 35 and is provided with a releasably detachable face plate 37 to provide the contact surface 21. The releasably detachable face plate 37 may be replaced should it become damaged over time. The upright bar 19 is mounted on the mast carriage intermediate the upright mast 11 and the side bar 7, adjacent to the side bar 7. Furthermore, the upright bar 19 is mounted on the mast carriage 9 adjacent the forward-most part of the upright mast 11 on the mast carriage 9.

Figure 2A:
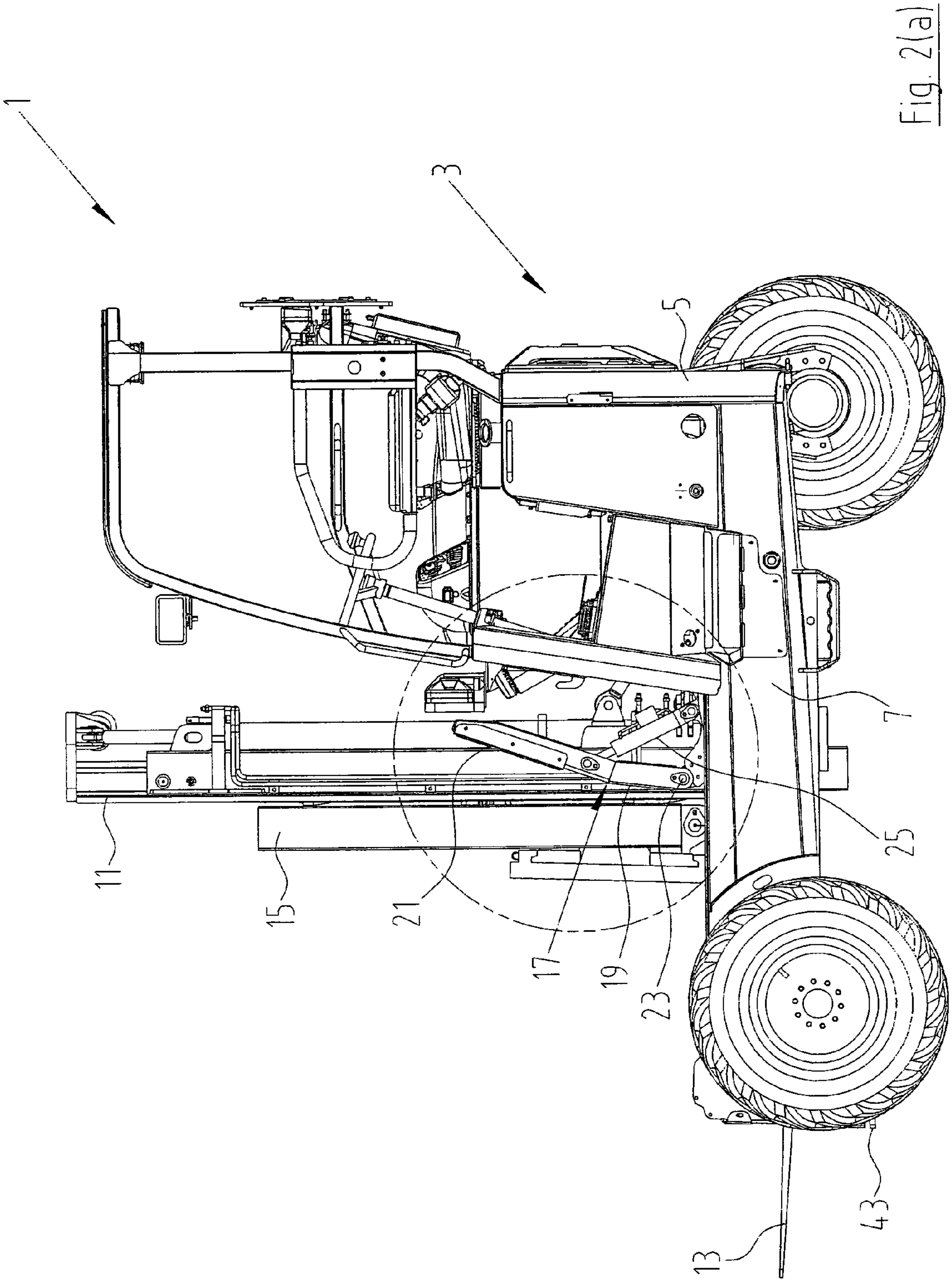
FIG. 2(*a*) is a side view of a piggy-back forklift truck with the mast and forks in a retracted position and the platform engaging load rest support in a stowed position.
Figure 2B:
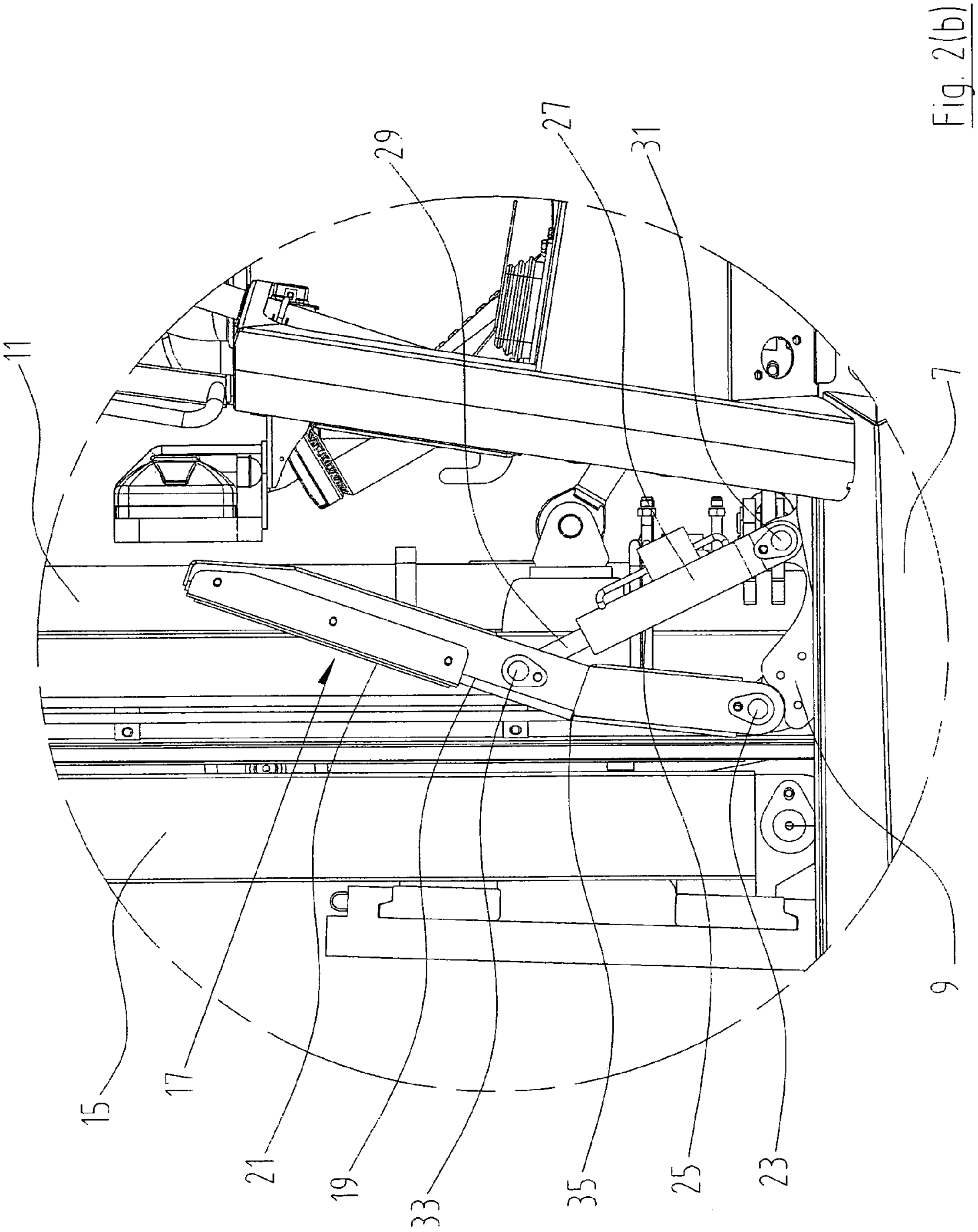

Referring to FIG. 2(*a*) of the drawings, a piggy-back forklift truck 1 is shown with the upright mast 11 in a fully retracted position, the forks 13 in a retracted position and the load rest support 17 in a stowed position. Referring to FIG. 2(*b*), it can be seen that the contact surface 21 of the upright bar 19 is rearward of the leading surface of the mast 11 and therefore will not come into contact with the platform (not shown). In this position, the load rest support 17 will not inhibit loading or unloading of the forklift on a carrying vehicle. The load rest support 17 will also not come into contact with the carrying vehicle in this position and therefore will not be prone to damage during mounting or dismounting of the piggy-back forklift on the carrying vehicle.

Figure 3A:
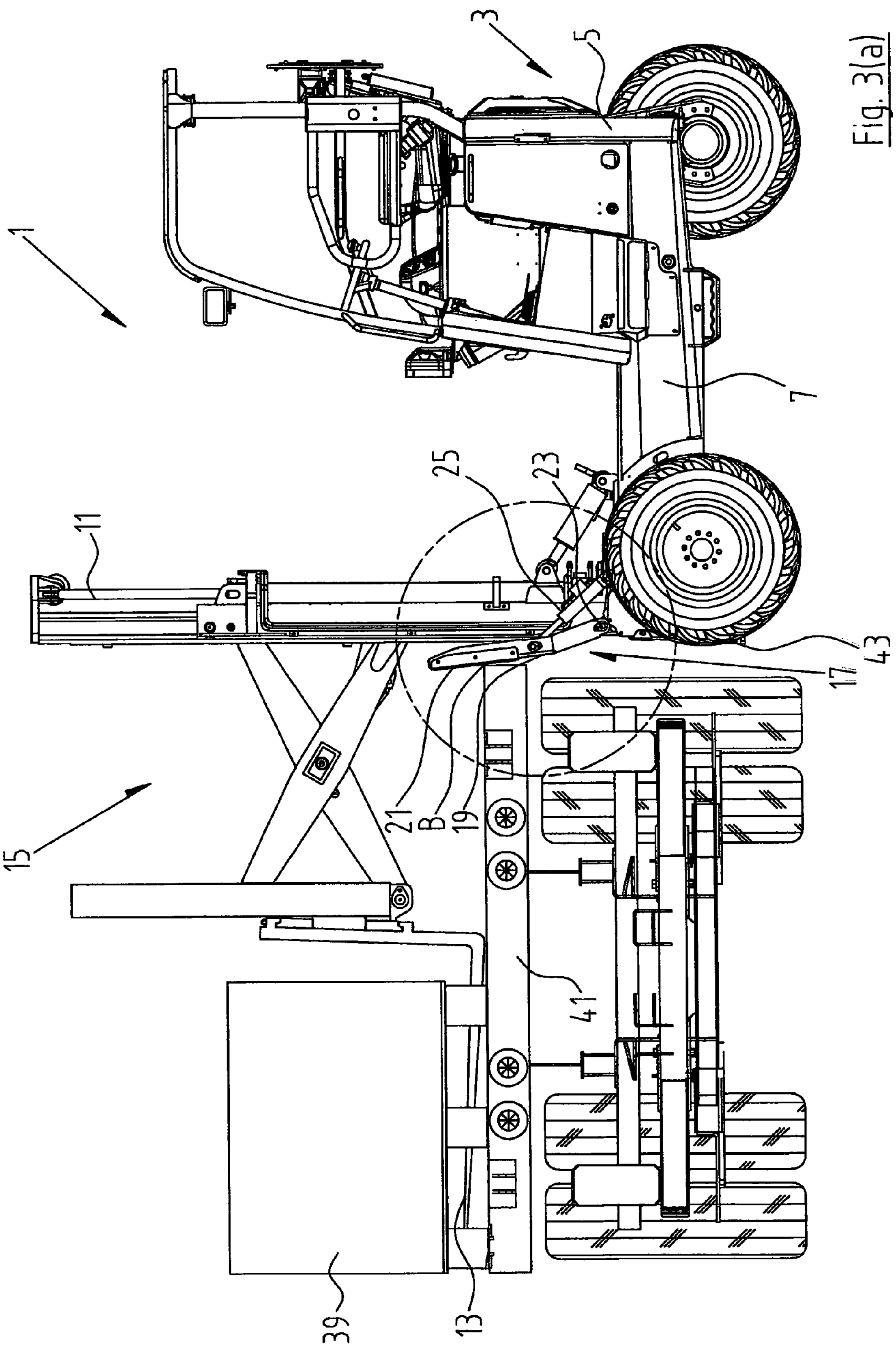
FIG. 3(*a*) is a side view of a piggy-back forklift truck in operation with the mast in a forward position, the forks fully extended and the load rest support engaging a platform.
Figure 3B:
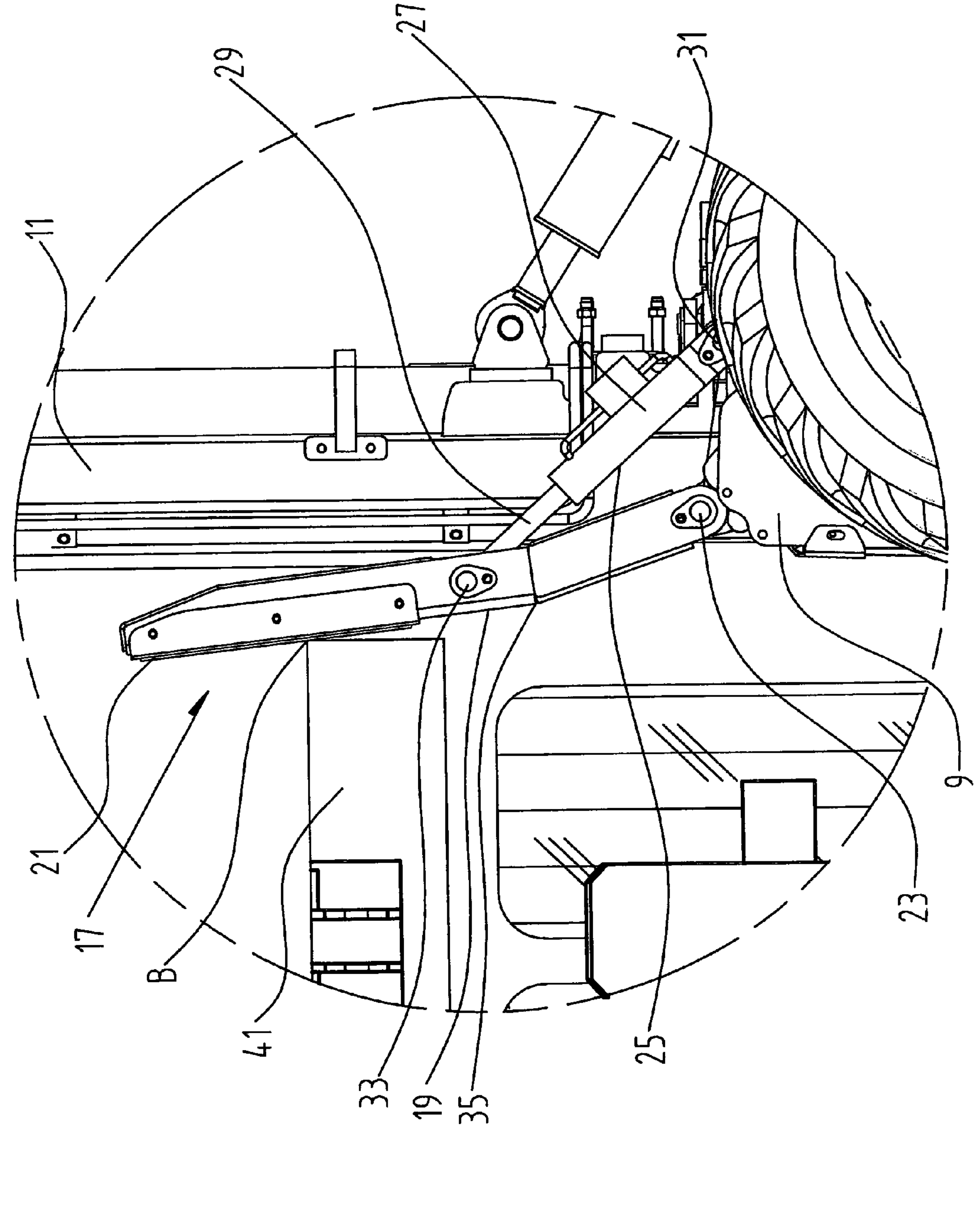

Referring to FIGS. 3(*a*) and 3(*b*) of the drawings, there is shown a piggy-back forklift truck with the upright mast 11 in its forward-most position on the chassis 3 and with the forks 13 fully extended by the pantograph linkage 15 in order to reach a load 39 on the far side of a platform 41, in this case a trailer bed of an articulated chassis. The sequential steps taken to load or unload a good on the far side of a platform are described in detail in EP 1 457 456, including the sequence of steps to operate the load rest supports to engage a trailer, and the description is incorporated herein by way of reference. The upright bar 19 has been pivoted about point 23 by the actuating ram 25 so that the contact surface 21 of the upright bar 19 engages a substantially vertical, external surface of the platform, the contact point indicated as B. Ground engaging stabilizers 43 that are known in the art and that are shown retracted may be extended to engage the ground and further stabilize the forklift. In this way, as the piggy-back forklift truck is at or near fully extended reach lifting the load 39, the contact surface 21 of the upright bars 19 engage against the platform 41 thereby allowing tilt and side shift of the upright mast 11 as the upright mast does not bear against the platform.

Referring specifically to FIG. 3(*b*) it can be seen that the contact surface 21 of the upright bar 19 is inclined forwardly in order to provide a more secure connection with the platform 41 as the upright bar 19 presses against the platform 41. This is particularly relevant when stabilizers 43 are used to steady the forklift as these stabilizers have a tendency to tilt the forklift backwards.

Figure 4A:
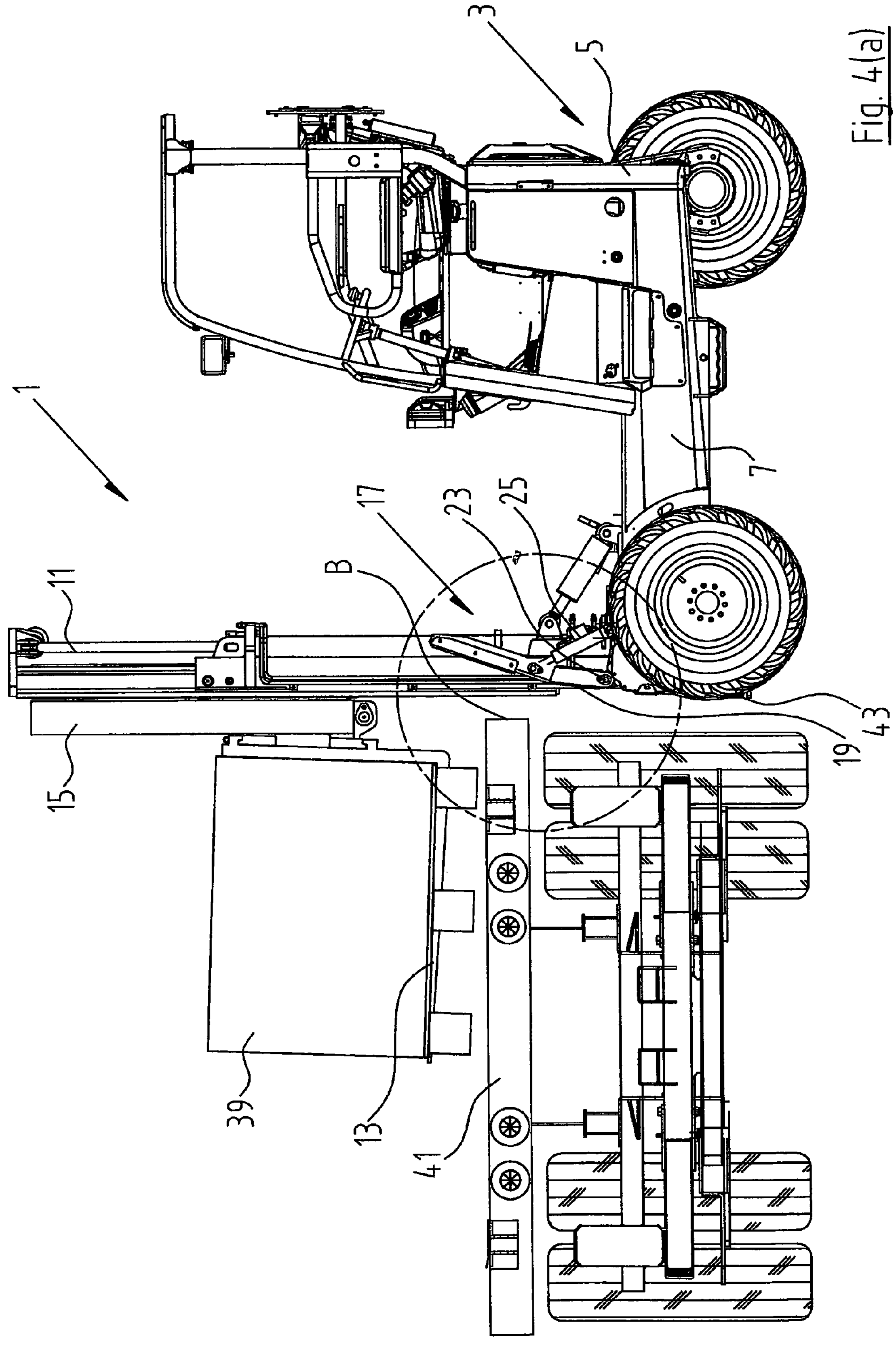
FIG. 4(*a*) is a side view of a forklift in operation with the mast in a forward position, the forks retracted and the load rest support disengaged from the platform in a stowed position.
Figure 4B:
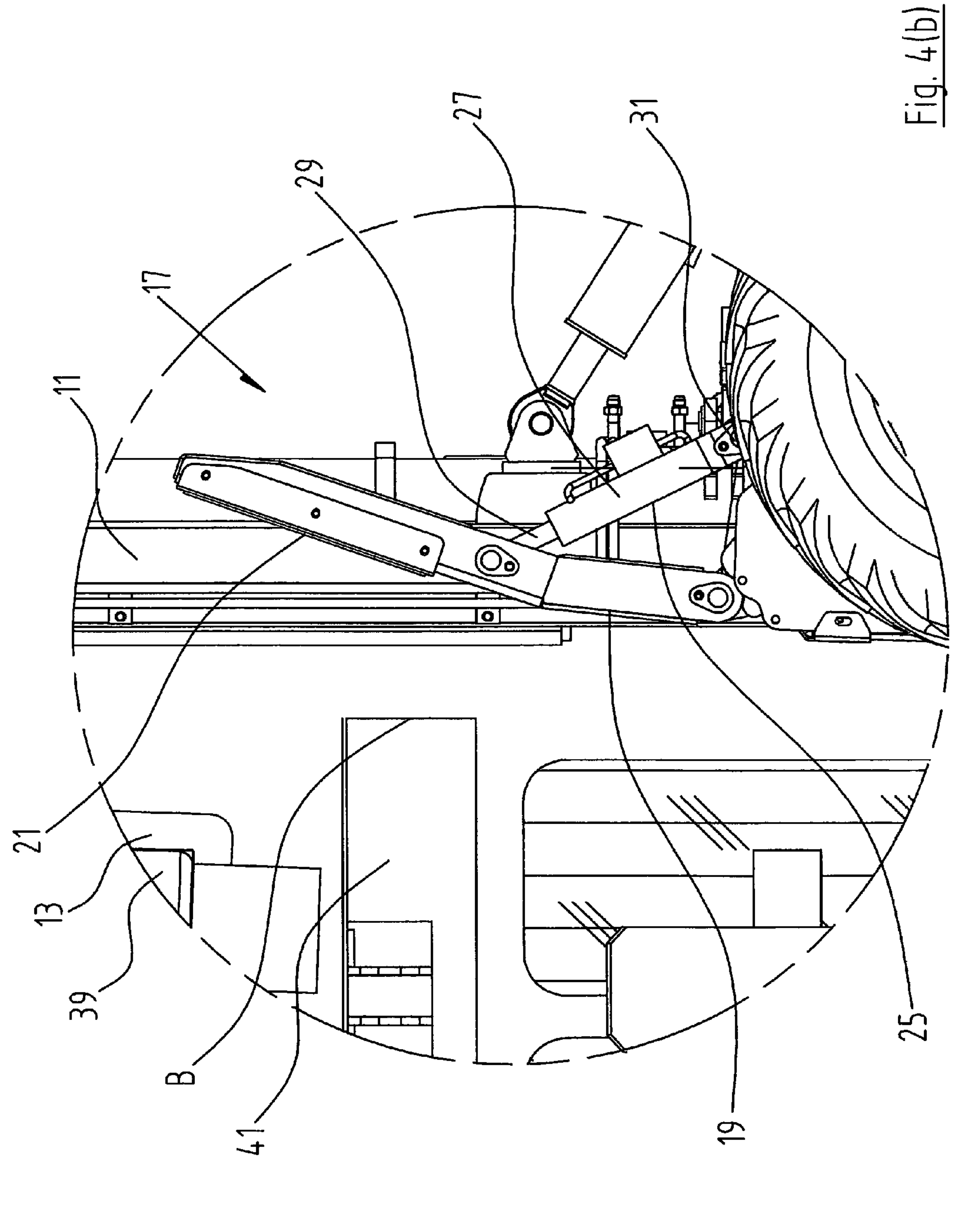

Referring now to FIG. 4(*a*) of the drawings, there is shown a side view of the forklift with the load fully engaged on the forks 13. The pantograph linkage 15 has been retracted to draw the load 39 towards the forklift. In this configuration, the forklift will have less tendency to tilt forwards and the upright bar 19 may be pivoted about pivot point 23 under operation of the ram 25 in order to move the upright bar rearward of the forward-most surface of the upright bar, as seen in FIG. 4(*b*). The operator of the forklift may then retract the mast on the chassis 3 if desired and transport the load to its desired destination.

It can be seen from a comparison of FIGS. 3(*a*) and 4(*a*) that the upright bar pivots through an angle of less then 45° and preferably less than 30°. In this way, the upright bar 19 may be pivoted to and from a platform engaging position with the contact surface 21 forward of the upright mast 11 and a stowed position with the contact surface 21 rearward of the leading surface of the mast quickly with a minimum of difficulty. Furthermore, the upright bar 19 will not have to rest flat along the mast carriage in the stowed configuration which will speed up the positioning of the upright bar. However, if it is desired to have the upright bar in a stowed configuration lying flat along the mast carriage this may be achieved in a relatively straightforward manner. Furthermore, it can be seen that the construction of the upright bar 19 is extremely simple and will be relatively easy to manufacture and cost effective to manufacture as well as install. No additional locking means are required in order to position the upright bar in either a stowed or a platform engaging position. Instead of the double-acting ram 25, operable to pivot the upright bar 19 to and from a platform engaging position forward of the mast and a stowed position in which the contact surface 21 is rearward of the leading surface of the mast, it would be possible to provide a single acting ram and a suitable spring return arranged to return the upright bar to a stowed position. It is envisaged that instead of using a pantograph linkage, it will be possible to use extendable forks such as those well known in the art, or other types of devices commonly known in the art for extending the reach of the forks relative to the mast.

Finally, it is envisaged that in certain embodiments of forklift truck, it will be possible to provide an upright bar that is fixed in position relative the mast carriage, in a position such as that shown in FIGS. 3(*a*) and 3(*b*) that will not be pivotable on the mast carriage. Therefore, the upright bar will always be in a platform engaging position. In certain embodiments it may not be necessary to retract the platform engaging bar as it may always be in front of the mast, yet behind the forward-most surface of the forks and therefore will not come in contact with the carrying vehicle when the forklift is being loaded or unloaded from the carrying vehicle, or indeed when it is stored on the carrying vehicle. This may however have certain implications on the side shifting capability of the mast.

Figure 5:
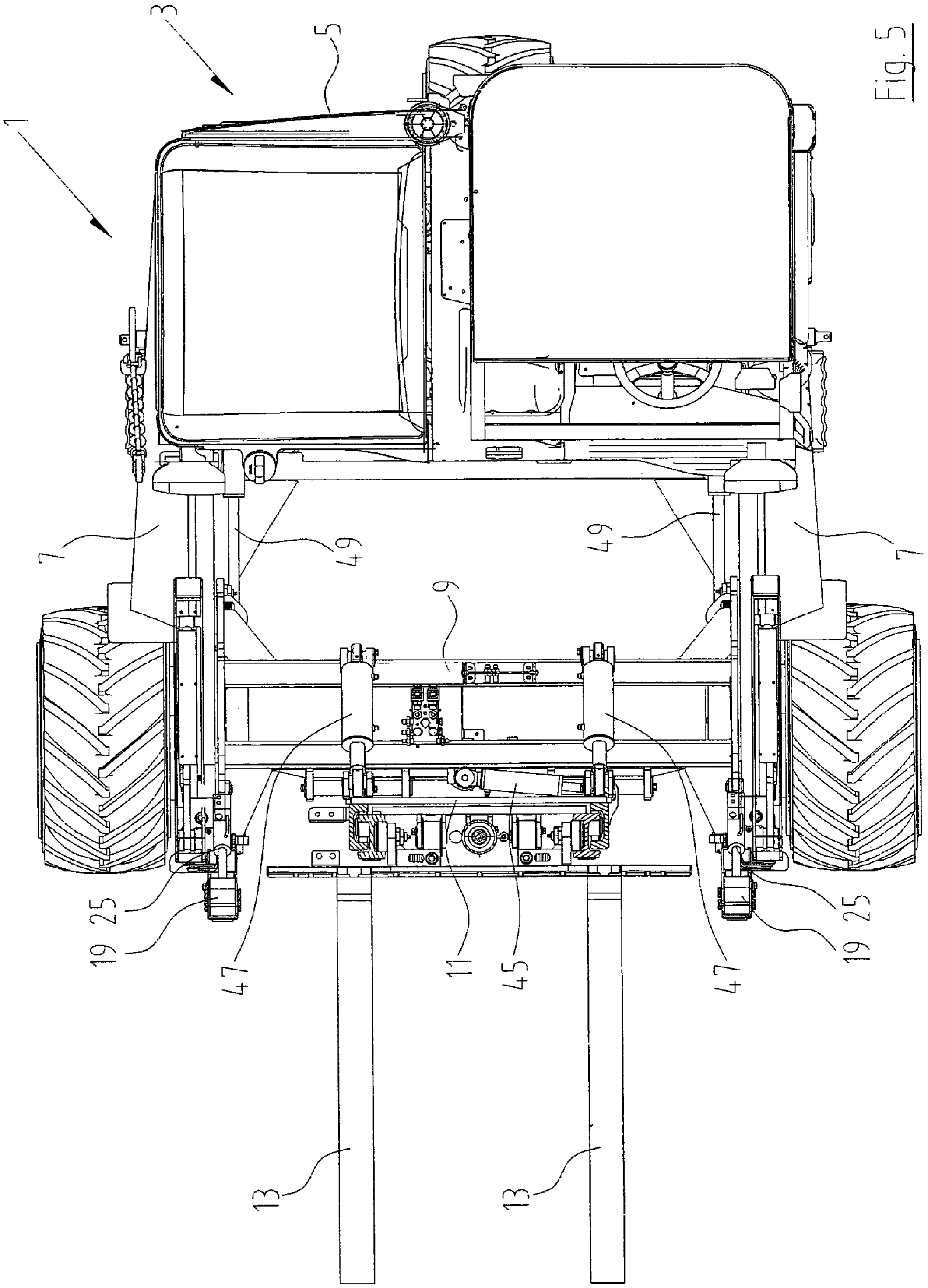
FIG. 5 is a top plan view of a forklift truck according to the present invention.

Referring to FIG. 5 of the drawings, there is shown a top plan view of the forklift truck with side load rests 17 according to the present invention. It can be seen that there are provided a pair of side load rests 17 each comprising an upright bar 19, one on either side of the upright mast 11. Furthermore, there is provided a side shift ram 45 and a pair of tilt rams 47 connected intermediate the upright mast and the mast carriage to shift the mast sideways and tilt the mast relative the mast carriage and the chassis, respectively. The upright bars 19 are shown in a platform engaging position. Furthermore, the means to move the mast carriage towards and away from the rear crossbar is provided by a pair of double acting rams 49, one adjacent to each side bar, one end of which is mounted on the chassis 3, the other end of which is connected to the mast carriage 9.

In the embodiments shown, the forklift truck is a three-wheeled forklift truck with a pair of front wheels adjacent the forward-most ends of the side bars and a rear steering wheel mounted centrally on the rear cross bar. However, the forklift could be provided with four wheels as opposed to three with a pair of rear wheels. Furthermore the forklift is shown with a standard upright mast. This upright mast may also be an upright mast with a boom mounted thereon, pivotally or otherwise, such as those described in the Applicants own co-pending European Patent Application Nos. EP 1 396 467 and EP 1 531 141.

It is further envisaged that a mast carriage interlock system may be incorporated in the present invention. This mast carriage interlock system operates to prevent the operator of the forklift from retracting the mast carriage until the attachment or reach device that permits extended reach to the forks is fully retracted. This ensures that the load is safe to lift without the lift assist being in operation. This may be accomplished by controlling and more specifically synchronizing the operation of the mast carriage rams and the reach attachment actuating mechanism that extends and retracts the reach of the forks.

In this specification the terms "comprise, comprises, comprised and comprising" and the terms "include, includes, included and including" are all deemed totally interchangeable and are to be given the widest possible interpretation and vice versa.

This invention is in no way limited to the embodiments hereinbefore described but may be varied in both construction and detail within the scope of the claims.

The invention claimed is:

1. A forklift truck adapted to be mounted on a carrying vehicle, the forklift truck comprising:

a U-shaped chassis comprising a rear crossbar and a pair of side bars mounted at either end of the rear crossbar and projecting forwardly therefrom;

a plurality of ground engaging wheels on the chassis;

a mast carriage slidably mounted on the chassis between the side bars and movable towards and away from the rear crossbar;

means to move the mast carriage towards and away from the rear crossbar;

an upright mast mounted on the mast carriage;

a pair of load carrying forks mounted on the upright mast;

means for altering the reach of the forks relative to the upright mast to remove and place loads on a raised platform; and a platform engaging load rest support, the platform engaging load rest support comprising a substantially upright bar mounted directly on the mast carriage independent of the upright mast, the substantially upright bar having a platform engaging contact surface for engagement against a substantially vertical, external facing surface of the raised platform.

2. The forklift truck as claimed in claim 1 in which the substantially upright bar is fixed in position relative the mast carriage with the platform engaging contact surface forward of the mast.

3. The forklift truck as claimed in claim 1 in which the substantially upright bar is pivotably mounted on the mast carriage and the platform engaging contact surface is pivotable to and from a platform engaging position forward of the upright mast and pivotable to and from a stowed position rearward of a leading surface of the upright mast.

4. The forklift truck as claimed in claim 3 in which there is provided means to pivot the upright bar to and from a platform engaging position and a stowed position.

5. The forklift truck as claimed in claim 4 in which the means to pivot the upright bar is provided by way of a ram, a first end of which is pivotably mounted on the mast carriage and a second end of which is connected to the upright bar.

6. The forklift truck as claimed in claim 5 in which ram is a double-acting ram.

7. The forklift truck as claimed in claim 3 in which the upright bar when pivoting to and from a platform engaging position and a stowed position, pivots through no more than a 45° angle.

8. The forklift truck as claimed in claim 3 in which the upright bar, when pivoting to and from a platform engaging position and stowed position, pivots through no more than a 30° angle.

9. The forklift truck as claimed in claim 1 in which the upright bar is cranked intermediate at its ends.

10. The forklift truck as claimed in claim 1 in which the upright bar is mounted on the mast carriage intermediate the mast and the side bar.

11. The forklift truck as claimed in claim 1 in which the upright bar is mounted on the mast carriage adjacent the forward-most part of the mast on the mast carriage.

12. The forklift truck as claimed in claim 1 in which the upright bar is mounted on the mast carriage adjacent the side bar.

13. The forklift truck as claimed claim 1 in which the contact surface of the upright bar is inclined forwardly when in a platform engaging position.

14. The forklift truck as claimed in claim 1 in which the upright bar is provided with a releasably detachable face plate to act as the contact surface.

15. The forklift truck as claimed in claim 1 in which there are provided a pair of upright bars, one mounted on either side of the upright mast on the mast carriage.

16. The forklift truck as claimed claim 1 in which the means to extend the reach of the forks relative to the mast comprises extendable forks.

17. The forklift truck as claimed in claim 1 in which the means to extend the reach of the forks relative to the mast comprises a pantograph linkage carried by the mast which in turn mounts a fork carrier carrying the forks.

18. The forklift truck adapted to be mounted on a carrying vehicle comprising:

a U-shaped chassis comprising a rear crossbar and a pair of side bars mounted at either end of the rear crossbar and projecting forwardly therefrom;

a plurality of ground engaging wheels on the chassis;

a mast carriage slidably mounted on the chassis between the side bars and movable towards and away from the rear crossbar;

means to move the mast carriage towards and away from the rear crossbar;

an upright mast mounted on the mast carriage;

a pair of load carrying forks mounted on the upright mast;

means for altering the reach of the forks relative to the upright mast to remove and place loads on a raised platform; and a platform engaging load rest support, the platform engaging load rest support comprising a substantially upright bar pivotably mounted on the mast carriage independent of the upright mast, the substantially upright bar having a platform engaging contact surface for engagement against a substantially vertical, external facing surface of the raised platform, the platform engaging contact surface being pivotable to and from a platform engaging position forward of the mast and pivotable to and from a stowed position rearward of a leading surface of the mast.

19. The forklift truck as claimed in claim 18 in which there is provided means to pivot the upright bar to and from a platform engaging position and a stowed position.

20. The forklift truck as claimed in claim 19 in which the means to pivot the upright bar is provided by way of a ram, one end of which is pivotably mounted on the mast carriage and the other end of which is connected to the upright bar.

21. The forklift truck as claimed in claim 20 in which ram is a double-acting ram.

22. The forklift truck as claimed in claim 18 in which the upright bar when pivoting to and from a platform engaging position and a stowed position, pivots through no more than a 45° angle.

23. The forklift truck as claimed in claim 18 in which the upright bar, when pivoting to and from a platform engaging position and stowed position, pivots through no more than a 30° angle.

24. The forklift truck as claimed in claim 18 in which the upright bar is cranked intermediate at its ends.

25. The forklift truck as claimed in claim 18 in which the upright bar is mounted on the mast carriage intermediate the mast and the side bar.

26. The forklift truck as claimed in claim 18 in which the upright bar is mounted on the mast carriage adjacent the forward-most part of the mast on the mast carriage.

27. The forklift truck as claimed in claim 18 in which the upright bar is mounted on the mast carriage adjacent the side bar.

28. The forklift truck as claimed in claim 18 in which the upright bar is provided with a releasably detachable face plate to act as the contact surface.

29. The forklift truck as claimed in claim 18 in which there are provided a pair of upright bars, one mounted on either side of the upright mast on the mast carriage.

30. The forklift truck adapted to be mounted on a carrying vehicle comprising:

a U-shaped chassis comprising a rear crossbar and a pair of side bars mounted at either end of the rear crossbar and projecting forwardly therefrom;

a plurality of ground engaging wheels on the chassis;

a mast carriage slidably mounted on the chassis between the side bars and movable towards and away from the rear crossbar;

means to move the mast carriage towards and away from the rear crossbar;

an upright mast mounted on the mast carriage;

a pair of load carrying forks mounted on the upright mast;

means for altering the reach of the forks relative to the upright mast to remove and place loads on a raised platform; and a platform engaging load rest support, the platform engaging load rest support comprising a substantially upright bar mounted directly on the mast carriage independent of the upright mast, the upright bar having a platform engaging contact surface for engagement against a substantially vertical, external facing surface of the platform, the upright bar being cranked intermediate its ends.

31. The forklift truck as claimed in claim 30 in which the substantially upright bar is fixed in position relative the mast carriage with the platform engaging contact surface forward of the mast.

32. The forklift truck as claimed in claim 30 in which the substantially upright bar is pivotably mounted on the mast carriage and the contact surface is pivotable to and from a platform engaging position forward of the mast and pivotable to and from a stowed position rearward of a leading surface of the mast.

33. The forklift truck as claimed in claim 32 in which there is provided means to pivot the upright bar to and from a platform engaging position and a stowed position.

34. The forklift truck as claimed in claim 33 in which the means to pivot the upright bar is provided by way of a ram, one end of which is pivotably mounted on the mast carriage and the other end of which is connected to the upright bar.

35. The forklift truck as claimed in claim 32 in which the upright bar when pivoting to and from a platform engaging position and a stowed position pivots through no more than a 45° angle.

36. The forklift truck as claimed in claim 30 in which the upright bar is mounted on the mast carriage intermediate the mast and the side bar.

37. The forklift truck as claimed in claim 30 in which the upright bar is mounted on the mast carriage adjacent the forward-most part of the mast on the mast carriage.

38. The forklift truck as claimed in claim 30 in which the upright bar is mounted on the mast carriage adjacent the side bar.

39. The forklift truck as claimed in claim 30 in which the upright bar is provided with a releasably detachable face plate to act as the contact surface.

40. The forklift truck as claimed in claim 30 in which there are provided a pair of upright bars, one mounted on either side of the upright mast on the mast carriage.

* * * * *

UNITED STATES PATENT AND TRADEMARK OFFICE

CERTIFICATE OF CORRECTION

PATENT NO. : 7,632,054 B2
APPLICATION NO. : 11/633645
DATED : December 15, 2009
INVENTOR(S) : McGrane et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this

Second Day of November, 2010

David J. Kappos

*Director of the United States Patent and Trademark Office*